J. W. GATES & O. P. HOBBS.
A. C. GATES, ADMINISTRATRIX OF J. W. GATES, DEC'D.
TANDEM SEAT ATTACHMENT.
APPLICATION FILED FEB. 10, 1912. RENEWED JUNE 14, 1913.
1,082,227.
Patented Dec. 23, 1913.
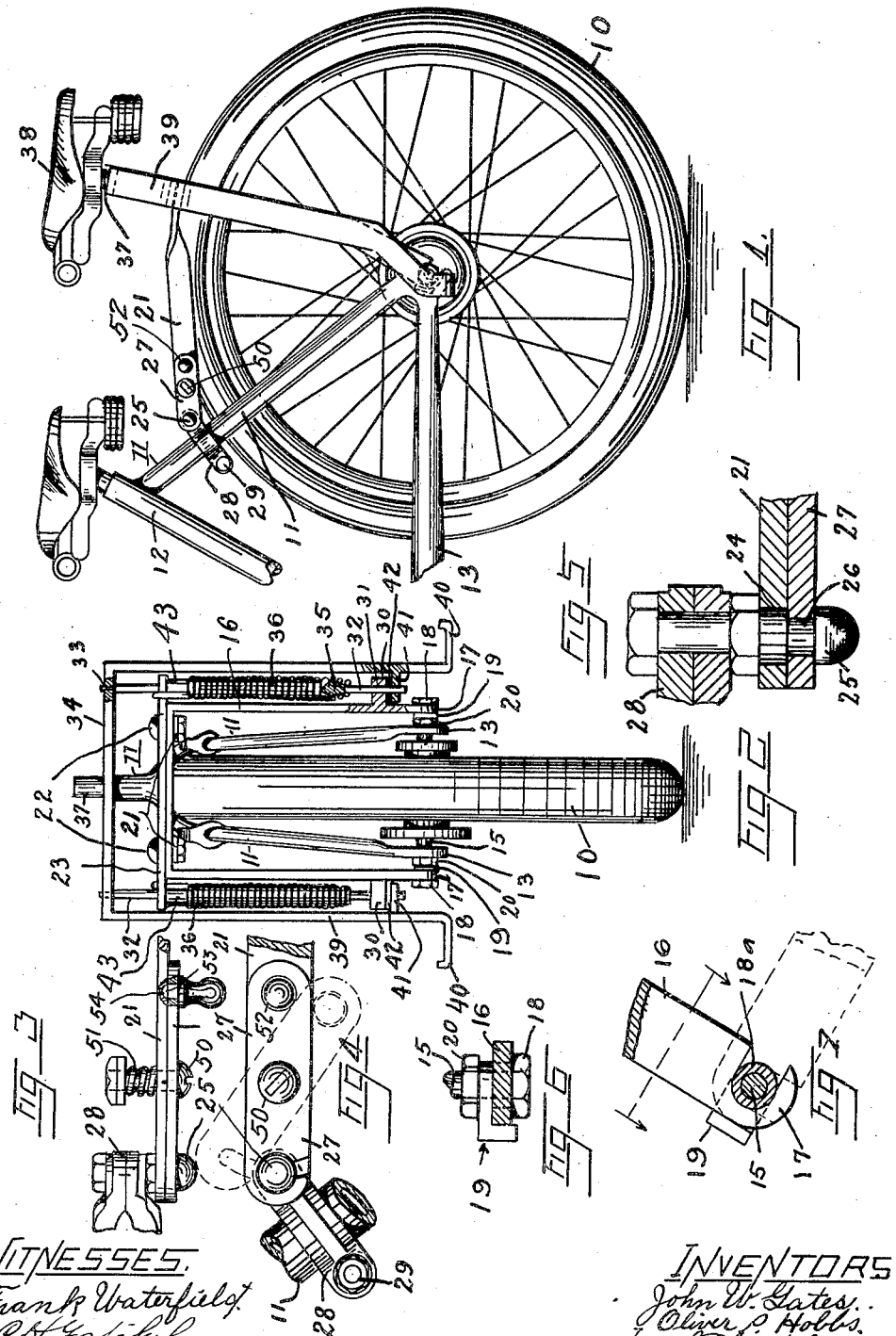

UNITED STATES PATENT OFFICE.

JOHN W. GATES AND OLIVER P. HOBBS, OF LOS ANGELES, CALIFORNIA; AMALIA C. GATES ADMINISTRATRIX OF SAID JOHN W. GATES, DECEASED.

TANDEM-SEAT ATTACHMENT.

1,082,227. Specification of Letters Patent. Patented Dec. 23, 1913.

Application filed February 10, 1912, Serial No. 676,361. Renewed June 14, 1913. Serial No. 773,761.

*To all whom it may concern:*

Be it known that we, JOHN W. GATES and OLIVER P. HOBBS, both citizens of the United States, residing at the city of Los Angeles, county of Los Angeles, and State of California, have invented new and useful Improvements in Tandem-Seat Attachments for Motor-Cycles, Bicycles, and like Machines, of which the following is a specification.

Our invention relates to the attachment of an additional seat to the vehicle; and the object thereof is to provide an attachment which can be quickly and easily attached to or detached from the vehicle, of simple construction, and having a maximum of ease in the vertical motion of the seat. We accomplish these objects by the attachment described herein and illustrated in the accompanying drawings forming a part hereof in which, Figure 1 is a side elevation of our attachment on a machine, of which the rear portion only is shown. Fig. 2 is a rear end elevation of the parts shown in Fig. 1 with the saddles removed. Figs. 3 and 4 are an edge and side detail view respectively of the top brace attaching means. Fig. 5 is an enlarged detail of the detachable part of the top brace. Figs. 6 and 7 are an edge and side detail view respectively, of the attaching devices by means of which the attachment is secured upon the rear axle of the machine.

In the drawings 10 is the rear wheel, 11 are the rear forks, 12 the seat post and 13 the lower bars of a motor cycle or bicycle, all of any standard construction.

15 is the rear axle which is of the usual construction.

Our attachment is composed of an inner U-shaped axle frame 16 the lower ends of which terminate in hooks 17 which hook over the shanks 18ª of lock nuts 18, which are screwed upon the outer ends of axle 15 and lock L-shaped hooks 19 upon the axle so that they project toward the front of the machine. The inner ends of hooks 19 have an internally threaded hole extending transversely therethrough and they also screw upon the axle until they contact with nuts 20 that hold the rear portion of the frame upon the rear axle. When securing the frame to the axle the upper end of the frame is dropped nearly to the ground, as shown in dotted lines in Fig. 7, and the hooked ends are then hooked over the shanks of nuts 18 and brought to their operative or upright position as shown in Fig. 1. In this position hooks 19 hold the frame from disengaging from the anxle. Brace bars 21 are then secured to the top of the axle frame by bolts 22 which pass through holes in the several parts. Guide bar 23 is also secured upon the top of the axle frame by bolts 22. In the other ends of the brace bars 21 are holes 24 which, when the bars are in place, are passed over the ends of bolts 25. These bolts have grooves 26, in which are received latches 27 which are pivotally secured to the brace bars and lock the brace bars from coming off bolts 25. Latch 27 is pivotally mounted on bolt 50 which passes through bar 21 and has a spring 51 coiled around it which holds the latch in spring pressed engagement with the bar. On the rear end of latch 27 is a knob 52 which passes through the latch and terminates in a small protuberance 53 which enters a socket 54 in bar 21 to hold the latch from accidentally turning when positioned for use. By pushing down on the knob the latch can be swung to the position shown in dotted lines in Fig. 4 when bar 21 can be removed from bolt 25. Bolts 25 also fasten one end of clamps 28 upon the rear forks 11. The other ends of clamps 28 are fastened upon the rear forks by bolts 29. When it is desired to remove the frame the latches are disengaged from bolts 25, the brace bars are disengaged therefrom, the upper end of the frame is dropped until the hooked ends can be disengaged from the shanks of nuts 18. The only parts then remaining on the vehicle are the clamps and the hooks on the axle which are not objectionable and can easily be removed if desired. Near the connection between the axle frame and the axle, the axle frame is provided with guide lugs 30 having holes 31 therein, in which are received thrust rods 32. These thrust rods also pass through guide bar 23 and their upper ends are reduced and pass through or into holes 33 in the cross bar 34 of the U-shaped seat frame. On the thrust rods near their lower ends are tapered enlarged portions 35 which form a bearing within the lower ends of thrust springs 36, which ends are also tapered. The upper ends of these springs are hooked over or into the ends of the guide bar within the thrust rods. The cross bar of the seat frame is provided with a seat post 37 on which is secured in the usual manner the rear saddle 38. To cross bar 34 are secured the side members 39 which terminate in foot rests 40. Adjacent to lugs 30 of the axle frame and below are the guide lugs 41 which are secured to the side members of the seat frame. The lower ends of the thrust rods also pass through lugs 41. On the thrust rods between lugs 30 and 41 are washers 42 to prevent noise.

In attaching the saddle frame to the axle frame the springs are first placed on the thrust rods, lugs 30 and 41 are brought into register with the washers between and the lower ends of the thrust rods are passed through the lugs, the upper ends of the thrust rods are then passed through the guide bar. The springs are then hooked into or over the guide bar. The thrust rods are then pressed downwardly until their upper ends can be passed into holes in the cross bars of the seat frame. After the clamps and hooks 19 are in place the attachments can then be quickly attached to the machine and as quickly detached. By removing the saddle frame the remaining parts provide an excellent luggage carrier.

It will be observed that the thrust springs carry the saddle frame so a very easy spring movement is provided. Bushings 43 are secured to the guide bar and extend into the springs. These bushings give a large wearing surface for the thrust rods and also hold the tops of the springs against lateral movement as they fit the bushings closely.

Having described our invention what we claim is:

1. A tandem seat attachment comprising a U-shaped axle frame; a U-shaped seat frame; guide lugs secured to said frames; thrust rods passing through said guide lugs and into the seat frame; and thrust springs mounted upon the thrust rods and having the lower ends held thereon and the upper ends secured to the top of the axle frame.

2. In a tandem seat attachment for motor cycles and like vehicles, means to detachably secure the same to the vehicle, comprising an axle frame terminating in hooks adapted to be hooked over the axle; and means to prevent the hooked ends from coming off the axle when positioned for use, said means after being once positioned being always ready for use without adjustment, and means secured to a fixed part and engaging the axle frame to secure the top of the axle frame to the machine frame.

3. In a tandem seat attachment for motor cycles and like machines, the combination of clamps on the rear forks of the machine, said clamps having projecting securing bolts having a groove near their ends; an L-shaped hook on the rear axle; a lock nut having a head and shank on the rear axle adapted to lock the L-shaped hook thereon so that it will project toward the front of the machine; a U-shaped axle frame having hooks on the lower ends of its members, said hooks being adapted to hook over the shanks of the lock nuts; brace bars secured at one end to the upper member of the axle frame and having holes in their other ends adapted to pass over the bolts of the clamps; and latches pivotally secured to the brace bars, said latches being adapted to engage the bolts of the clamps at the grooves therein and detachably lock the brace bars on the clamps.

In witness that we claim the foregoing we have hereunto subscribed our names this 27th day of January, 1912.

JOHN W. GATES.
OLIVER P. HOBBS.

Witnesses:
FRANK WATERFIELD,
G. E. HARPHAM.

Correction in Letters Patent No. 1,082,227.

It is hereby certified that Letters Patent No. 1,082,227, granted December 23, 1913, upon the application of John W. Gates and Oliver P. Hobbs, of Los Angeles, California, for an improvement in "Tandem-Seat Attachments," were erroneously issued to Amalia C. Gates, administratrix, and said Oliver P. Hobbs, jointly as owners of said invention, whereas said Letters Patent should have been issued to *Amalia C. Gates, as administratrix*, she being owner of the *entire interest* in said invention as shown by the records of assignments in this office; and that the said Letters Patent should be read with this correction therein that the same may conform to the record of the case in the Patent Office.

Signed and sealed this 24th day of February, A. D., 1914.

[SEAL.]

J. T. NEWTON,
*Acting Commissioner of Patents.*